United States Patent
Sotty et al.

(10) Patent No.: US 12,409,889 B2
(45) Date of Patent: Sep. 9, 2025

(54) REAR STRUCTURE FOR AN ELECTRIC VEHICLE

(71) Applicant: ArcelorMittal, Luxembourg (LU)

(72) Inventors: Alexandre Sotty, Compiègne (FR); Elie Gibeau, Pont-Sainte-Maxence (FR); Nicolas Schneider, Saint Martin Longueau (FR); Yves Drouadaine, Pontoise (FR)

(73) Assignee: ArcelorMittal, Luxembourg (LU)

( * ) Notice: Subject to any disclaimer, the term of this patent is extended or adjusted under 35 U.S.C. 154(b) by 464 days.

(21) Appl. No.: 17/640,058

(22) PCT Filed: Jul. 31, 2020

(86) PCT No.: PCT/IB2020/057274
§ 371 (c)(1),
(2) Date: Mar. 3, 2022

(87) PCT Pub. No.: WO2021/044234
PCT Pub. Date: Mar. 11, 2021

(65) Prior Publication Data
US 2022/0332371 A1    Oct. 20, 2022

(51) Int. Cl.
*B62D 21/15*    (2006.01)
*B62D 29/00*    (2006.01)
*C22C 38/00*    (2006.01)
*C22C 38/02*    (2006.01)
*C22C 38/06*    (2006.01)
*C22C 38/22*    (2006.01)
*C22C 38/26*    (2006.01)
(Continued)

(52) U.S. Cl.
CPC ......... *B62D 21/152* (2013.01); *B62D 29/007* (2013.01); *C22C 38/002* (2013.01); *C22C 38/02* (2013.01); *C22C 38/06* (2013.01); *C22C 38/22* (2013.01); *C22C 38/26* (2013.01); *C22C 38/28* (2013.01); *C22C 38/32* (2013.01); *C22C 38/38* (2013.01)

(58) Field of Classification Search
CPC ....... B62D 21/15; B62D 21/152; B62D 25/08
USPC .......................... 296/187.11, 193.08, 203.04
See application file for complete search history.

(56) References Cited

U.S. PATENT DOCUMENTS 7,237,829 B2 *   7/2007   Latimer, III ....... B62D 25/2036
                                              296/187.11
7,950,724 B2 *   5/2011   Yamaguchi .......... B62D 25/087
                                              296/187.11
(Continued)

FOREIGN PATENT DOCUMENTS

CN    104245484 A    12/2014
CN    108528532 A    9/2018
(Continued)

OTHER PUBLICATIONS

Search Report of PCT/IB2020/057274 dated Sep. 29, 2020.
(Continued)

*Primary Examiner* — Jason S Daniels
(74) *Attorney, Agent, or Firm* — Davidson Kappel LLC

(57) ABSTRACT

Rear structure for an electric vehicle having a rear rail which includes a rear portion, a front portion and a transition zone, such that in the event of a rear crash the rear portion and the transition zone are both able to deform to maximize the amount of energy absorption.

8 Claims, 4 Drawing Sheets

(51) Int. Cl.
  *C22C 38/28* (2006.01)
  *C22C 38/32* (2006.01)
  *C22C 38/38* (2006.01)

(56) References Cited

U.S. PATENT DOCUMENTS

| | | | | |
|---|---|---|---|---|
| 8,382,199 | B2* | 2/2013 | Bodin | B62D 21/152 |
| | | | | 296/187.11 |
| 2009/0278384 | A1* | 11/2009 | Yamada | B62D 25/087 |
| | | | | 296/187.11 |
| 2013/0221709 | A1* | 8/2013 | Mildner | B62D 25/087 |
| | | | | 296/204 |
| 2015/0091329 | A1 | 4/2015 | Caillard et al. | |
| 2017/0073015 | A1* | 3/2017 | Hong | B62D 21/155 |
| 2018/0065670 | A1 | 3/2018 | Yamada et al. | |
| 2018/0251157 | A1 | 9/2018 | Yoshimoto et al. | |
| 2018/0362089 | A1 | 12/2018 | Viaux | |
| 2018/0362096 | A1 | 12/2018 | Baccouche et al. | |
| 2018/0363096 | A1 | 12/2018 | Sohmshetty et al. | |
| 2019/0300058 | A1 | 10/2019 | Lam et al. | |

FOREIGN PATENT DOCUMENTS

| | | |
|---|---|---|
| CN | 109219554 A | 1/2019 |
| DE | 19746238 A1 | 5/1998 |
| DE | 102010052794 A1 | 5/2012 |
| EP | 1388485 A1 | 2/2004 |
| EP | 2921570 A1 | 9/2015 |
| JP | 2017159895 A | 9/2017 |
| JP | 2018039312 A | 3/2018 |
| JP | 2019503920 A | 2/2019 |
| WO | WO 2017098306 A1 | 6/2017 |

OTHER PUBLICATIONS

Written Opinion of PCT/IB2020/057274.
Pascal Dietsch et al. in "Methodology to assess fracture during crash simulation: fracture strain criteria and their calibration", in Metallurgical Research Technology vol. 114, No. 6, 2017.

* cited by examiner

REAR STRUCTURE FOR AN ELECTRIC VEHICLE

The present invention relates to a rear structure for an automotive vehicle having an electrical powertrain, here after referred to as an electric vehicle. The present invention further relates to a method for producing such a rear structure.

BACKGROUND

The environmental concerns and regulations associated with the increase of carbon dioxide levels in the atmosphere and with local air pollution levels is pushing for the rise of electrically powered automotive vehicles. Compared to traditional internal combustion engine vehicles, electric vehicles have smaller engines, no fuel tank and no exhaust system. On the other hand, electric vehicles have a sizeable battery pack, which is not present in internal combustion engines.

The rear structure of a vehicle is designed to withstand a rear crash. An example of rear crash test used in assessing vehicle safety is the Federal Motor Vehicle Safety Standard 301 (FMVSS301), in which a vehicle is impacted by a moving deformable barrier having a weight of 1361 kg, moving at a speed of 80 km/h and hitting the rear of the vehicle with a 70% overlap.

A rear rail is a part of the rear structure of the vehicle extending longitudinally from the rear end of the vehicle to below the rear floor panel. It comprises:
  a rear portion extending substantially in the longitudinal direction at the same elevation as the rear bumper assembly and attached at its rear end to the rear bumper assembly,
  a front portion extending substantially in the longitudinal direction at a lower elevation than the rear portion and attached to the vehicle lateral reinforcement structure,
  a transition zone comprising at least an upper bend and a lower bend, linking the rear section and the front section.

The current conception of the rear rail takes into account the need to absorb energy in case of a rear collision, while protecting the fuel tank, which is commonly located beneath the rear passenger seats. Indeed, the integrity of the fuel tank is essential to the safety of passengers. A breached fuel tank can lead to fuel leaks and fire hazard complications.

The current design of the rear rail is as follows:
  the rear portion absorbs energy during a rear collision, through controlled buckling for example
  the front portion and the transition zone act as anti-intrusion elements to protect the fuel tank.

This rear rail design presents some limitations. Indeed, in case of a rear shock having an energy higher than the energy absorption capacity of the rear structure, the transition zone and the rear portion will transmit remaining crash energy in the form of kinetic energy to the body of the vehicle and to the occupants. In such a case, the vehicle will be pushed forward or crushed against an obstacle in front and the safety of the occupants may be affected.

SUMMARY OF THE INVENTION

One of the aims of the current invention is to overcome these limitations in the case of an electric vehicle, taking into account the absence of fuel tank, by proposing a design which optimizes the energy absorption potential of the rear rail.

To this end the present invention relates to a rear structure for an electric vehicle, wherein the product of the ultimate tensile strength by the average thickness of the transition zone is comprised between 1 and 1.5 times the product of the ultimate tensile strength by the average thickness of the rear portion and wherein the transition zone is made from a material having a fracture strain of at least 0.6 and a critical bending angle of at least 75°.

By applying the above described invention, it is possible to absorb energy during a rear collision not only through the controlled buckling deformation of the rear section but also through the double bending deformation of the transition zone in its upper and lower bends.

According to other optional features of the rear structure according to the invention, considered alone or according to any possible technical combination:
  The material from which the rear rail is manufactured as at least an ultimate tensile strength of 700 MPa on the part.
  The rear portion is equipped with geometrical alterations which locally alter its cross section.
  At least part of the rear rail is made by hot stamping a material having a tensile strength of at least 1000 MPa after hot stamping.
  At least part of the rear rail is made by hot stamping a press-hardened steel comprising in % weight:
    0.20%≤C≤0.25%, 1.1%≤Mn≤1.4%, 0.15%≤Si≤0.35%, Cr≤0.30%, 0.020%≤Ti≤0.060%, 0.020%≤Al≤0.060%, S≤0.005%, P≤0.025%, 0.002%≤B≤0.004%, the remainder being iron and unavoidable impurities resulting from the elaboration.
  At least part of the rear rail is made by cold stamping a material having a tensile strength of at least 950 MPa.
  At least part of the rear rail is made by cold stamping a material having a chemical composition comprising in weight %: 0.13%<C<0.25%, 2.0%<Mn<3.0%, 1.2%<Si<2.5%, 0.02%<Al<1.0%, with 1.22%<Si+Al<2.5%, Nb<0.05%, Cr<0.5%, Mo<0.5%, Ti<0.05%, the remainder being Fe and unavoidable impurities and having a microstructure comprising between 8% and 15% of retained austenite, the remainder being ferrite, martensite and bainite, wherein the sum of martensite and bainite fractions is comprised between 70% and 92%.
  At least part of the rear rail is made by cold stamping a material having a chemical composition comprising in weight %: %: 0.15%<C<0.25%, 1.4%<Mn<2.6%, 0.6%<Si<1.5%, 0.02%<Al<1.0%, with 1.0%<Si+Al<2.4%, Nb<0.05%, Cr<0.5%, Mo<0.5%, the remainder being Fe and unavoidable impurities and having a microstructure comprising between 10% and 20% of retained austenite, the remainder being ferrite, martensite and bainite.
  The rear rail is formed by stamping a tailor welded blank.
  The rear rail is formed by stamping a tailor rolled blank.

The present invention further concerns a method for production a rear structure 1 described previously, comprising the steps of:
  providing a blank
  stamping the blank into the shape of the rear rail 3
  attaching the rear rail 3 to the rear bumper assembly 5
  attaching the rear rail 3 to the lateral reinforcement structure 11.

BRIEF DESCRIPTION OF THE DRAWINGS

Other aspects and advantages of the invention will appear upon reading the following description, given by way of example, and made in reference to the appended drawings, wherein:

FIG. 4A depicts the situation before the collision occurs, FIG. 4B 60 ms after the collision, FIG. 4C 100 ms after the collision.

DETAILED DESCRIPTION

In the following description, the terms "upper", "lower", "front", "rear", "transverse" and "longitudinal" are defined according to the usual directions of a mounted vehicle. More particularly, the terms "upper" and "lower", are defined according to the elevation direction of the vehicle, the terms "front", "rear" and "longitudinal" are defined according to the front/rear direction of the vehicle and the term "transverse" is defined according to the width of the vehicle. By "substantially parallel" or "substantially perpendicular" it is meant a direction which can deviate from the parallel or perpendicular direction by no more than 15°.

More particularly, the term "fracture strain" and "critical bending angle" refer to the fracture strain criterion and the critical bending angle criterion defined by Pascal Dietsch et al. in "Methodology to assess fracture during crash simulation: fracture strain criteria and their calibration", in Metallurgical Research Technology Volume 114, Number 6, 2017. The critical bending angle defines the angle at which the first cracks are detected on the extrados of a sample which has been deformed according to the standardized VDA-238-100 Standard. The fracture strain is the associated equivalent strain within the material at the point of the deformation when the critical bending angle has been reached.

The yield strength, the ultimate tensile strength and the uniform and total elongation are measured according to ISO standard ISO 6892-1, published in October 2009.

The average thickness of a part or a portion of a part is the thickness of the corresponding area of the sheet which is used to produce said part.

The term "controlled buckling" refers to the mode of deformation of a part subjected to a compressive load, where the part progressively absorbs the mechanical energy of the compressive load by forming a series of successive waves resulting from successive local buckling deformations of the part. As a result, the length of the part as measured in the direction of the compressive load is smaller after the deformation than the initial length of the part in said direction. In other words, when a part reacts to a compressive load by controlled buckling, it folds onto itself in the same way as a plastic bottle on which a compressive load is applied between the top and the bottom of the bottle.

Figure 1:
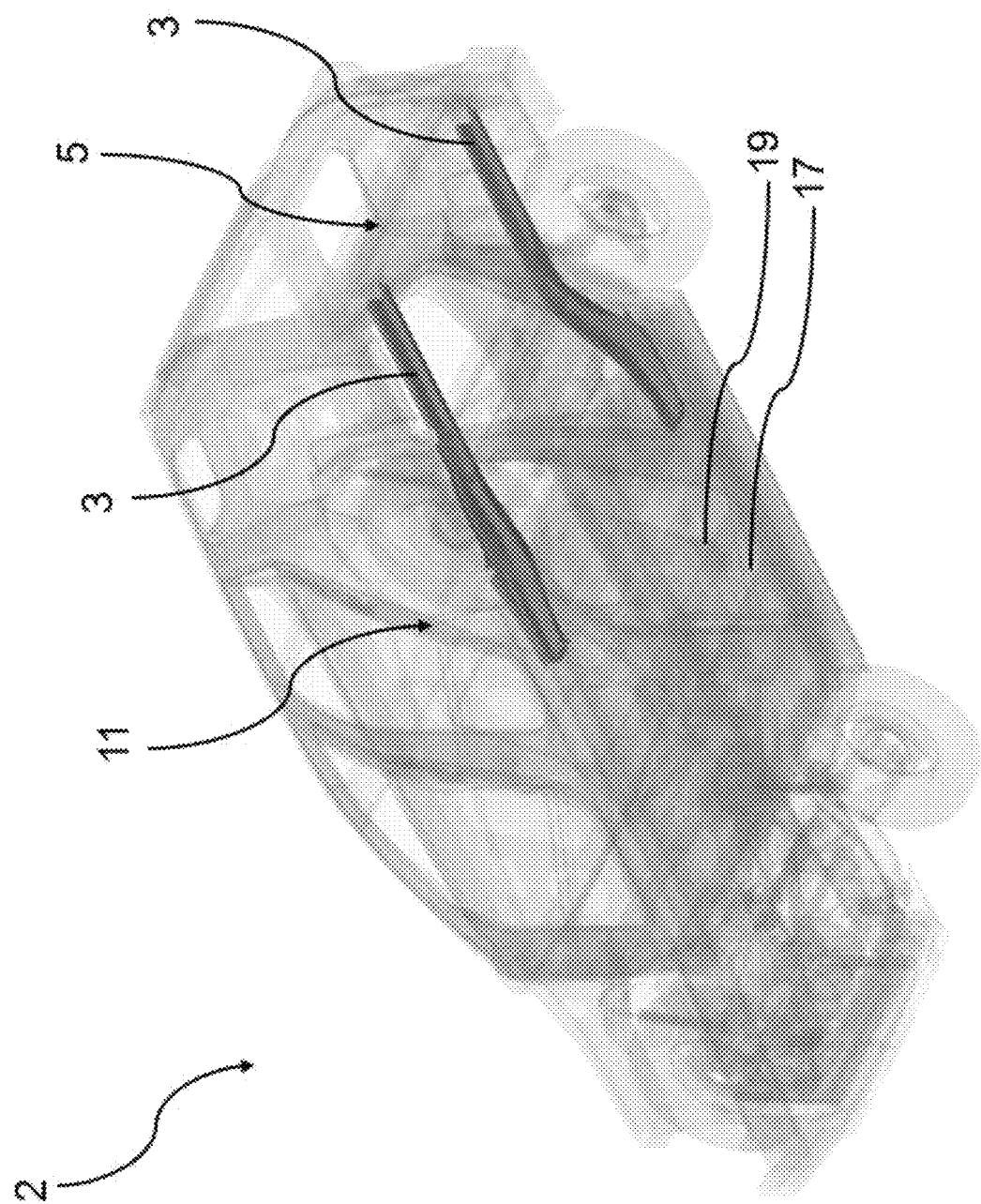
FIG. 1 is an overall perspective view of a vehicle according to the invention
Figure 2:
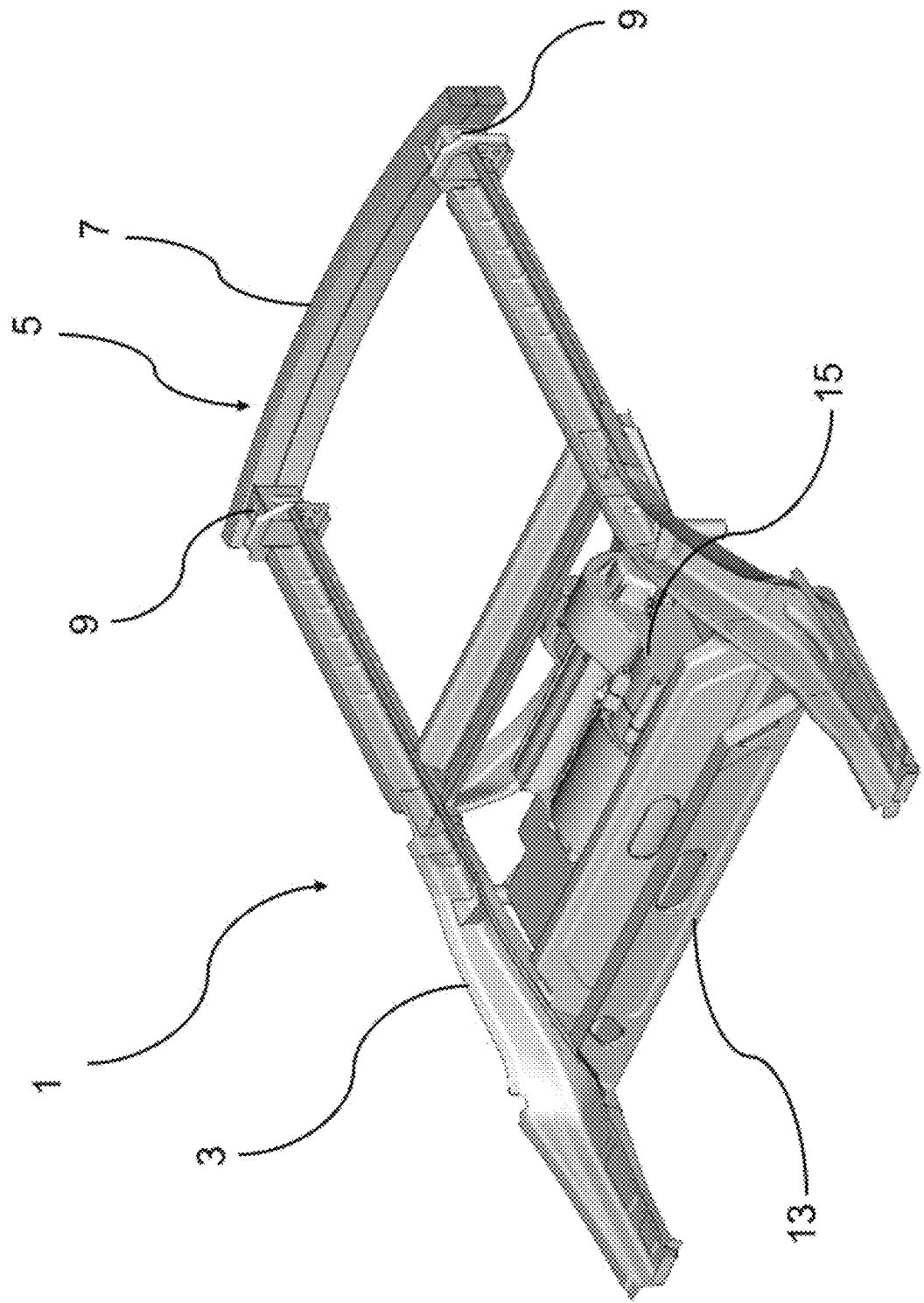
FIG. 2 is an overall perspective view of the rear structure according to the invention

Referring to FIGS. 1 and 2, a rear structure 1 for an electric vehicle 2 is described. The rear structure 1 comprises at least two rear rails 3 and a rear bumper assembly 5. The rear bumper assembly 5 comprises for example a rear bumper beam 7 and two rear crash boxes 9. The rear rails 3 are attached at their rear end to the rear bumper assembly 5, for example by welding. The rear rails 3 are further attached at their front end to a vehicle lateral reinforcement structure 11, on either side of the vehicle.

In a particular embodiment, the rear structure 1 further comprises an anti-intrusion cross-member 13 extending between the two rear rails 3 along a substantially transverse direction.

In a particular embodiment, the electric vehicle 2 comprises an electric engine 15 located towards the rear of the vehicle, behind the anti-intrusion cross member 13.

The electric vehicle 2 further comprises a battery pack 17, located below the floor panel 19. Said battery pack 17 is used to store the electric energy that will be used to power the vehicle by the electric engine or engines.

Figure 3:
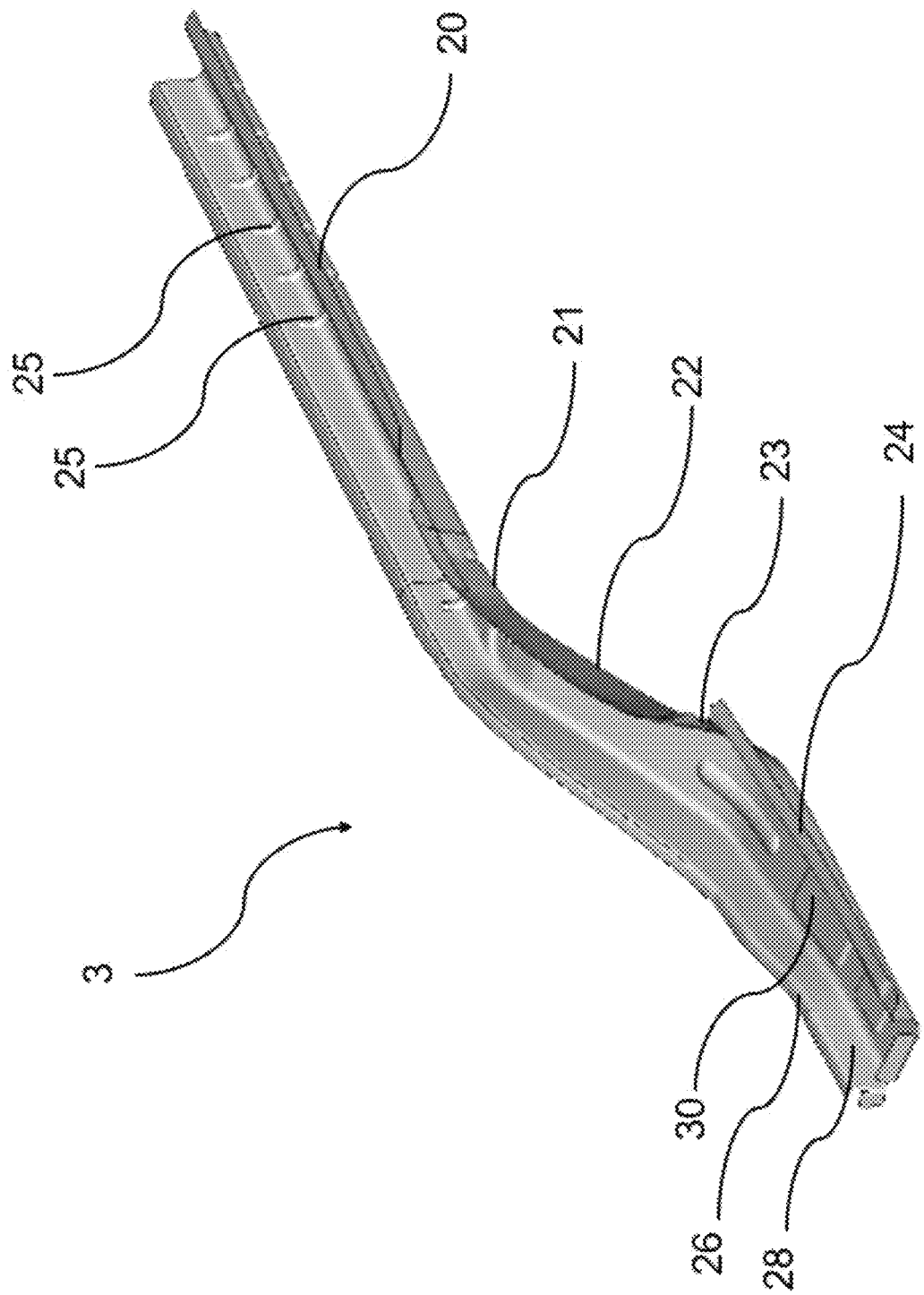
FIG. 3 is an individual perspective view of the left-hand side rear rail according to the invention

Referring to FIGS. 1 and 3, each rear rail 3 comprises at least:

- a rear portion 20 extending substantially in the longitudinal direction at the same elevation as the rear bumper assembly 5 and attached at its rear end to the rear bumper assembly 5. In a particular embodiment, the rear portion 20 is equipped with geometric alterations 25, which are designed to locally alter the cross section of the rear portion 20, thereby acting as mechanical triggers in the case of a compressive loading of the rear portion 20. Because the geometric alterations 25 have a different section than the rest of the rear portion 20, they will either deform by buckling before the main body of the rear portion 20 in the case where the geometric alterations have a smaller cross section than the main body of the rear portion 20, or they will force the buckling deformation to take place in between two geometric alterations in the case where the geometric alterations have a bigger cross section than the main body of the rear portion 20. Advantageously, by placing several such geometric alterations 25 along the length of the rear portion 20, one can promote the controlled buckling mode of deformation in case of a crash and control the exact behavior of the controlled buckling of the rear portion 20. It should be noted that by extension, such geometric alterations can consist of areas within the rear portion 20 where material has been removed along part of the cross sections. The presence of such holes within the cross section will locally lower the cross section and therefore act as areas where buckling preferentially occurs.
- a front portion 24 extending substantially in the longitudinal direction at a lower elevation than the rear portion 20 and attached to the vehicle lateral reinforcement structure 11,
- a transition zone 22 comprising at least an upper bend 21 and a lower bend 23, said upper bend 21 being an inflexion region linking the front of the rear portion 20 to the rest of the rear rail 3 and said lower bend 23 being an inflexion region linking the rear of the front portion 24 to the rest of the rear rail 3. The transition zone 22 is delimited by the upper bend 21 on its rear end and the lower bend 23 on its front end. The presence of said bends 21, 23 enables the rear rail 3 to comprise two different horizontal portions, the rear portion 20 and the front portion 24, extending in a longitudinal direction at different elevations.

The front portion 24 is attached to the lateral reinforcement structure 11, for example by spot welding. For example, the rear portion 24 is attached to the side sill, or the C-pillar lower, which are both parts of the lateral reinforcement structure 11. The attachment can be performed for example by spot welding on to one of the following flat surfaces of the rear portion 24: the flanges 26, the vertical walls 28 or the bottom wall 30.

The material from which the transition zone 22 is made has a fracture strain of at least 0.6 and a critical bending angle of at least 75°. This ensures that the upper and lower bends 21, 23 will bend and deform during a collision, ensuring maximum energy absorption, without breaking, as will be detailed later.

The material from which the transition zone 22 is made is such that the product of the ultimate tensile strength by the average thickness of the transition zone 22 is comprised between 1 and 1.5 times the product of the ultimate tensile strength by the average thickness of the rear portion 20. The product of the ultimate tensile strength by the average thickness of a material is a measure of this material's propensity to deform under a given load. The higher this product, the less the material is prone to deform. The design of the current invention ensures that once the rear portion 20 is fully deformed, the transition zone 22 will take over the energy absorption role in the rear rail 3, as will be detailed later.

Figure 4A:
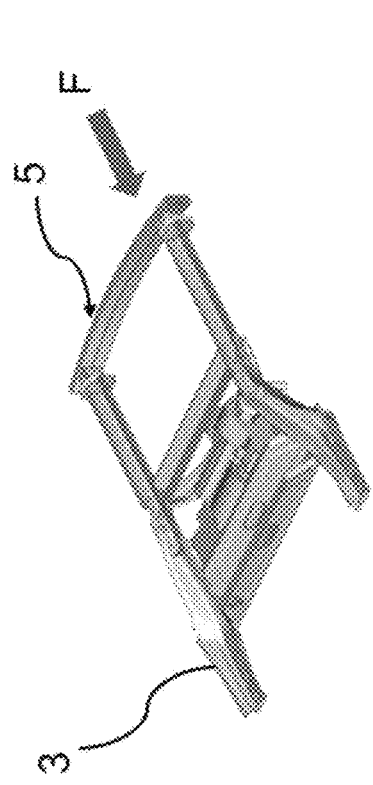
FIGS. 4A, 4B and 4C are a series of figures depicting a rear crash test simulation of a vehicle according to the invention, using the FMVSS301 standardized crash described above.
Figure 4B:
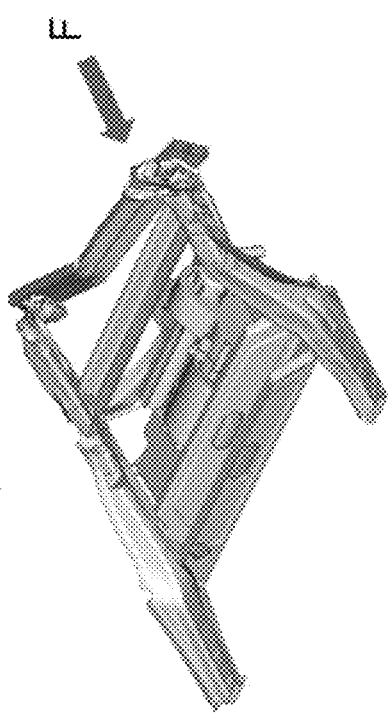
Figure 4C:
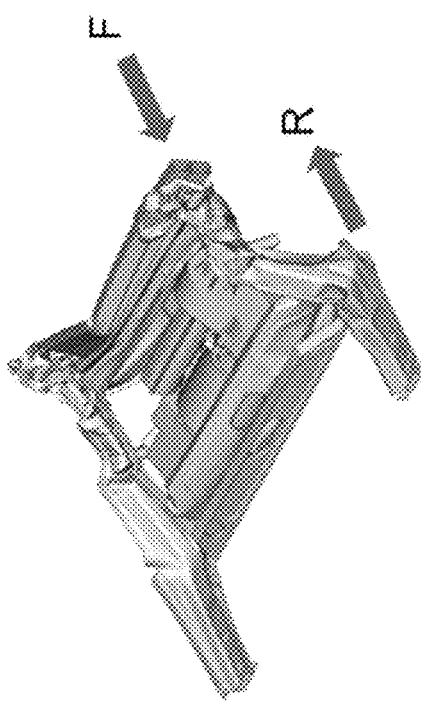

A closer view of the sequence of events in the case of a rear collision, such as the FMVSS301 standardized collision, is depicted in FIGS. 4A, 4B and 4C:

FIG. 4A depicts the rear structure before the movable deformable barrier hits it. The impact force F which will be exerted by the movable deformable barrier is depicted on the figure. It has a longitudinal direction and exerts itself on 70% of the width of the vehicle, the left hand side of the vehicle being fully covered by the barrier, while the 30% of the right-hand side of the vehicle is not impacted by the barrier.

As depicted in FIG. 4B, the barrier first impacts the rear bumper beam 7, which transmits the impact force F to the crash boxes 9, which are deformed by controlled buckling and themselves transmit the impact force F to the rear rail 3. Because of the 70% overlap towards the left-hand side of the vehicle, the left-hand rear rail 3 is more involved in the crash scenario than the right-hand rear rail 3. The key role of the rear rail 3 in the event of a rear collision is clearly apparent at this stage. The impact force F generated by the impact is first transmitted to the rear portion 20, which will deform by controlled buckling, thereby absorbing by mechanical deformation part of the impact energy.

As depicted in FIG. 4C, once the rear portion 20 is fully crushed, the transition zone 22 comes under the pressure of the impact force F. Because the front portion 24 is attached to the lateral reinforcement structure 11, the front portion 24 will not move during a rear collision. This generates a reaction force R to the impact force F. The transition zone 22 is thus submitted to the combined effects of the impact force F and the reaction force R, exerting themselves substantially longitudinally in opposing directions and at two different elevations. The impact force F follows the elevation of the rear portion 20 and the reaction force R follows the elevation of the front portion 24. Under the combined effect of F and R, the transition zone 22 deforms in the areas where the stress concentration is highest, i.e. the upper and lower bends 21, 23. The combined effect of F and R creates a bending moment in the upper and lower bends 21, 23, which leads to a bending deformation in these areas, thereby absorbing a significant amount of the energy of the crash.

It should be noted that the front portion 24 is not significantly deformed during the crash, because it is attached to elements of the lateral reinforcement structure 11. This ensures that the space located in between the front portion 24 of each of the rear rails 3 will not be intruded upon during a rear collision. It is therefore possible to have sensitive elements in this space, such as for example the rear end of the battery pack 17, which can thus extend up to the rear end of the rear floor panel. The bigger the battery pack 17, the more energy can be stored and therefore the longer the range of the vehicle, which is a key point in designing electric vehicles. By guaranteeing an anti-intrusion zone in between the front portion 24 of each rear rail 3, the present invention permits design of a long battery pack 17, extending up to the rear end of the rear floor panel.

Because the transition zone 22 has a minimum fracture strain of 0.6 and a critical bending angle of at least 75°, the upper and lower bends 21, 23 will not break under the combined effect of F and R but will rather deform. If the minimum fracture strain and critical bending angle of the transition zone 22 are too low, there will be a rapid onset of cracks in the upper and lower bend followed by a catastrophic failure of the part. This would result in a much lower crash energy absorption and possible critical safety issues for the passengers and damages to the battery pack.

As explained previously, the product of the ultimate tensile strength by the average thickness of the transition zone 22 is at least equal or greater than the product of the ultimate tensile strength by the average thickness of the rear portion 20. This allows to control the sequence of deformation within the rear rail 3, ensuring that the rear portion 20 deforms first by controlled buckling and only afterwards setting off the deformation sequence of the transition zone 22. In a particular embodiment in which the rear portion 20 is further equipped with geometric alterations 25, the rear portion 20 will have an even greater propensity to deformation under compressive load, which will add robustness to the sequence of events during a crash.

Ensuring that the behavior of the rear rail 3 follows a pre-determined sequence of deformation during a collision, as detailed above, is important for the vehicle designer. Indeed, the designer is then able to anticipate what happens and to plan accordingly to ensure the best protection of the passengers and the critical elements of the vehicle.

As explained previously, the product of the ultimate tensile strength by the average thickness of the transition zone 22 is not greater than 1.5 times the product of the ultimate tensile strength by the average thickness of the rear portion 20. Indeed, if the transition zone 22 is too rigid and not prone to deform under the impact of the crash, then the transition zone 22 will act as an anti-intrusion zone, without deforming significantly. This would greatly diminish the energy absorbed by the rear rail 3, thereby increasing the amount of transmitted kinetic energy from the crash, which could put at risk the passengers of the vehicle and of surrounding vehicles also.

In a particular embodiment, the material from which the rear rail 3 is made has an ultimate tensile strength of at least 700 MPa. Advantageously, this guarantees a structural stability to the rear rail 3 and also ensures that the rear rail 3 will absorb an important amount of energy when deforming during a collision.

In a particular embodiment, at least part of the rear rail 3 is made by hot stamping a material having a tensile strength of at least 1000 MPa after hot stamping. Advantageously, the use of hot stamping technology enables to produce complex shapes with high resistance and no springback issues after forming. Furthermore, using high strength material with more than 1000 MPa mechanical resistance on the final part ensures a high energy absorption during a collision.

For example, the above mentioned press-hardened steel comprises in % weight: 0.20%≤C≤0.25%, 1.1%≤Mn≤1.4%, 0.15%≤Si≤0.35%, Cr≤0.30%, 0.020%≤Ti≤0.060%, 0.020%≤Al≤0.060%, S≤0.005%, P≤0.025%, 0.002%≤B≤0.004%, the remainder being iron and unavoidable impurities resulting from the elaboration.

In a particular embodiment, at least part of the rear rail 3 is made by cold stamping a material having a tensile strength of at least 950 MPa. Advantageously, the use of high strength material with more than 950 MPa mechanical resistance on the final part ensures a high energy absorption during a collision. Furthermore, using cold stamping rather than hot stamping as mentioned in the previous embodiment, can reduce manufacturing costs.

For example, the rear rail 3 is made by cold stamping a material having a chemical composition comprising in weight %: 0.13%<C<0.25%, 2.0%<Mn<3.0%, 1.2%<Si<2.5%, 0.02%<Al<1.0%, with 1.22%<Si+Al<2.5%, Nb<0.05%, Cr<0.5%, Mo<0.5%, Ti<0.05%, the remainder being Fe and unavoidable impurities and having a microstructure comprising between 8% and 15% of retained austenite, the remainder being ferrite, martensite and bainite, wherein the sum of martensite and bainite fractions is comprised between 70% and 92%.

In another example, the rear rail 3 is made by cold stamping a material having a chemical composition comprising in weight %: %: 0.15%<C<0.25%, 1.4%<Mn<2.6%, 0.6%<Si<1.5%, 0.02%<Al<1.0%, with 1.0%<Si+Al<2.4%, Nb<0.05%, Cr<0.5%, Mo<0.5%, the remainder being Fe and unavoidable impurities and having a microstructure comprising between 10% and 20% of retained austenite, the remainder being ferrite, martensite and bainite.

According to a particular embodiment, the rear rail 3 is made by stamping a tailor welded blank. The tailor welded blank can be made of materials of different thicknesses and strength levels for cold stamping. Alternatively, it can be made of materials of different thicknesses and strength levels for hot stamping. Advantageously, using different grades and thicknesses allows more flexibility to the designer to optimize the performance and weight of the part. Furthermore, it enables to further control the deformation sequence of the rear rail 3 by placing in the rear portion 20 a material such that the ultimate tensile strength by the average thickness is smaller than that of the transition zone 22. As explained above, this will force the rear portion 20 to deform first in the event of a rear crash.

According to a particular embodiment, the rear rail 3 is made by stamping a tailor rolled blank. This provides similar advantages as in the case of a tailor welded blank, explained previously. For example, the rear portion 20 will be made of a material having a lower average thickness than the transition zone 22.

In a particular embodiment, the rear rail is made of a material having an average thickness comprised between 0.8 mm and 2.0 mm. For example, the rear rail 3 is made by hot stamping a tailor welded blank having a first portion, corresponding to the front portion 24 and the transition zone 22, consisting of a material having an average thickness of 1.1 mm and an ultimate tensile strength above 1000 MPa after hot stamping and a second portion, corresponding to the rear portion 20 of the rear rail 3, having a material of an average thickness of 0.9 mm and an ultimate tensile strength above 1000 MPa after hot stamping.

The Method for producing the above described rear structure will now be described. It comprises the steps of:
providing a blank
stamping the blank into the shape of the rear rail 3
attaching the rear rail 3 to the rear bumper assembly 5
attaching the rear rail 3 to the lateral reinforcement structure 11.

What is claimed is:

1. A rear structure for an electric vehicle, the rear structure comprising:
at least two rear rails, each comprising at least:
a rear portion extending in the longitudinal direction at a same elevation as a rear bumper assembly and attached at a rear end to the rear bumper assembly;
a front portion extending in the longitudinal direction at a lower elevation than the rear portion and attached to a vehicle lateral reinforcement structure; and
a transition zone including at least an upper bend and a lower bend, linking the rear portion and the front portion;
wherein a product of an ultimate tensile strength by an average thickness of the transition zone is between 1 and 1.5 times a product of the ultimate tensile strength by an average thickness of the rear portion and wherein the transition zone is made from a material having a fracture strain of at least 0.6 and a critical bending angle of at least 75°, wherein at least part of at least one of rear rails is made by cold stamping a material having a tensile strength of at least 950 MPa,
wherein the material has a chemical composition having in weight %: 0.13%<C<0.25%, 2.0%<Mn<3.0%, 1.2%<Si<2.5%, 0.02%<AI<1.0%, with 1.22%<Si+AI<2.5%, Nb<0.05%, Cr<0.5%, Mo<0.5%, Ti<0.05%, a remainder being Fe and unavoidable impurities and having a microstructure comprising between 8% and 15% of retained austenite, a microstructure remainder being ferrite, martensite and bainite, wherein a sum of martensite and bainite fractions is between 70% and 92%.

2. The rear structure as recited in claim 1 wherein the rear portion is equipped with at least one geometrical alteration locally altering a cross section.

3. The rear structure as recited in claim 1 wherein at least one of the rear rails is formed by stamping a tailor welded blank.

4. A method to produce the rear structure as recited in claim 1, the method comprising the steps of:
providing a blank;
stamping the blank into the shape of one of the rear rails;
attaching the one rear rail to the rear bumper assembly; and
attaching the rear rail to the lateral reinforcement structure.

5. A rear structure for an electric vehicle, the rear structure comprising:
at least two rear rails, each comprising at least:
a rear portion extending in the longitudinal direction at a same elevation as a rear bumper assembly and attached at a rear end to the rear bumper assembly;
a front portion extending in the longitudinal direction at a lower elevation than the rear portion and attached to a vehicle lateral reinforcement structure; and
a transition zone including at least an upper bend and a lower bend, linking the rear portion and the front portion;
wherein a product of an ultimate tensile strength by an average thickness of the transition zone is between 1 and 1.5 times a product of the ultimate tensile strength by an average thickness of the rear portion and wherein the transition zone is made from a material having a fracture strain of at least 0.6 and a critical bending angle of at least 75°, wherein at least part of at least one of rear rails is made by cold stamping a material having a tensile strength of at least 950 MPa, wherein the material has a chemical composition having in weight %: %: 0.15%<C<0.25%, 1.4%<Mn<2.6%, 0.6%<Si<1.5%, 0.02%<Al<1.0%, with 1.0%<Si+Al<2.4%, Nb<0.05%, Cr<0.5%, Mo<0.5%, a remainder being Fe and unavoidable impurities and having a microstructure comprising between 10% and 20% of retained austenite, a microstructure remainder being ferrite, martensite and bainite.

6. The rear structure as recited in claim 5 wherein at least one of the rear rails is formed by stamping a tailor rolled blank.

7. A method to produce the rear structure as recited in claim 5, the method comprising the steps of:
   providing a blank;
   stamping the blank into the shape of one of the rear rails;
   attaching the one rear rail to the rear bumper assembly; and
   attaching the rear rail to the lateral reinforcement structure.

8. The rear structure as recited in claim 5 wherein the rear portion is equipped with at least one geometrical alteration locally altering a cross section.

\* \* \* \* \*